US00RE38066E

(19) United States
(12) Reissued Patent
Puthawala

(10) Patent Number: US RE38,066 E
(45) Date of Reissued Patent: Apr. 8, 2003

(54) ELECTROLYSIS APPARATUS

(75) Inventor: Anwer Puthawala, Buckenhof (DE)

(73) Assignee: Framatome ANP Gmb, Erlangen (DE)

(21) Appl. No.: 09/761,237

(22) Filed: Jan. 17, 2001

Related U.S. Patent Documents

Reissue of:
(64) Patent No.: 6,071,386
Issued: Jun. 6, 2000
Appl. No.: 09/265,155
Filed: Mar. 9, 1999

U.S. Applications:

(63) Continuation of application No. PCT/DE98/01770, filed on Jun. 26, 1998.

(30) Foreign Application Priority Data

Jul. 9, 1997 (DE) ..... 197 29 429

(51) Int. Cl.[7] ..... C25B 9/00
(52) U.S. Cl. ..... 204/230.5; 204/258; 204/283
(58) Field of Search ..... 204/256, 258, 204/283, 229.8, 253, 230.5

(56) References Cited

U.S. PATENT DOCUMENTS 4,056,452 A 11/1977 Campbell
4,210,511 A 7/1980 Campbell et al.
4,247,376 A 1/1981 Dempsey et al.
4,331,523 A * 5/1982 Kawasaki ..... 204/258 X
4,498,942 A * 2/1985 Asano et al. ..... 204/283 X
5,186,806 A * 2/1993 Clark et al. ..... 204/258 X
5,460,705 A * 10/1995 Murphy et al. ..... 204/256 X

FOREIGN PATENT DOCUMENTS

DE 23 34 647 1/1975
DE 30 00 313 C2 7/1980

* cited by examiner

*Primary Examiner*—Donald R. Valentine
(74) *Attorney, Agent, or Firm*—Laurence A. Greenberg; Werner H. Stemer; Gregory L. Mayback

(57) ABSTRACT

An electrolysis apparatus has a number of membrane electrolysis cells. Each of the cells has a membrane formed on both sides with a contact layer. The apparatus, while it is compact in its design, is also suitable for comparatively high hydrogen production rates and can consequently be used particularly flexibly. A contact plate is respectively arranged on each contact layer. Each of the contact plates is formed, on its surface facing the contact layer assigned to it, with a system of ducts for the transport of water and/or gas.

7 Claims, 3 Drawing Sheets

ELECTROLYSIS APPARATUS

Matter enclosed in heavy brackets [ ] appears in the original patent but forms no part of this reissue specification; matter printed in italics indicates the additions made by reissue.

CROSS-REFERENCE TO RELATED APPLICATION

This is a continuation of copending International Application PCT/DE98/01770, filed Jun. 26, 1998, which designated the United States.

BACKGROUND OF THE INVENTION

Field of the Invention

The invention relates to an electrolysis apparatus with a number of membrane electrolysis cells, each of which comprises a membrane that is provided on both sides with a contact layer.

In an electrolysis apparatus, a medium is electrolytically decomposed by applying a supply voltage between an anode and a cathode. If water is used as the medium, hydrogen and oxygen are thereby formed. Such an electrolysis apparatus can consequently be used for generating hydrogen and/or oxygen as and when required. For example, an electrolysis apparatus may be provided for injecting hydrogen as and when required into the primary coolant loop of a pressurized water reactor.

An electrolysis apparatus may be designed as a membrane electrolyzer. In that case, the electrolysis apparatus comprises a number of membrane electrolysis cells, in which the functional principle of a fuel cell is reversed. The functional principle of a fuel cell is described, for example, in the paper "Brennstoffzellen für Elektrotraktion" [fuel cells for electrotraction], K. Strasser, VDI-Berichte [Reports by the Association of German Engineers], No. 912 (1992), pages 125 et seq.

In the case of such a membrane electrolysis cell, the water provided as the medium is supplied to a membrane arranged between the anode and the cathode, in particular a cation exchanger membrane, provided as the electrolyte. The membrane is thereby usually provided with a contact layer on each of both sides. The first contact layer serves as the anode and the second contact layer serves as the cathode. Such a membrane electrolysis cell is distinguished by a particularly compact design, so that an electrolysis unit with a number of membrane electrolysis cells can be accommodated in a particularly confined space.

For the use of an electrolysis apparatus as a hydrogen generator in the industrial sector or in the power plant sector, it is necessary for its production capacity to be designed to meet the basic hydrogen requirement. If that is the case, the design of the electrolysis apparatus as a membrane electrolyzer, which is desirable with regard to structural advantages, may be unsuitable, particularly for applications with a comparatively high hydrogen requirement.

SUMMARY OF THE INVENTION

It is accordingly an object of the invention to provide an electrolysis apparatus with a number of membrane electrolyzers of the type mentioned, which overcomes the above-mentioned disadvantages of the heretofore-known devices and methods of this general type and which, while being of a compact design, is also suitable for comparatively high hydrogen production rates and can consequently be used particularly flexibly.

With the foregoing and other objects in view there is provided, in accordance with the invention, an electrolysis apparatus, comprising:

- a plurality of membrane electrolysis cells each having a membrane formed with a contact layer on both sides thereof;
- a contact plate disposed on each of the contact layers and having a surface facing the respectively associated contact layer; and
- each contact plate having a system of ducts formed in the surface facing the contact layer for transporting water and/or gas.

The invention is based on the concept that a membrane electrolyzer, which is also suitable for high hydrogen production rates, should have a number of membrane electrolysis cells with membranes dimensioned over a particularly large area. Even with such dimensioning of the membranes, reliable feeding of the membranes with the medium to be decomposed, in particular water, should be ensured. For this purpose, a transport system which is reliable and also suitable for large-area membranes is provided for the medium and also for the gas generated in the electrolysis process for each membrane of the electrolysis apparatus. A particularly compact design can be achieved in this case by the transport system being integrated into the contact plates provided for the electrical contacting of the electrodes fitted on the membranes.

In accordance with an added feature of the invention, the system of ducts is a plurality of concentric circular segments. This is particularly preferably because it has been found that in the case of such an arrangement of the system of ducts a particularly favorable and reliable feeding of all the active regions of a membrane can be achieved. The membrane electrolysis cells are in this case expediently connected electrically in series.

In accordance with an additional feature of the invention, a porous conductor plate is disposed between each contact layer and a respective contact plate. Such a porous conductor plate, which may be formed for example from titanium, on the one hand establishes a reliable electrical contact between the contact layer and the contact plate assigned to it, while on the other hand unhindered passage of the medium to be decomposed to the membrane and of the electrolytically generated gas into the system of ducts is ensured. The porous conductor plate in this case additionally enhances the distribution of the supplied medium on the membrane.

In accordance with another feature of the invention, each system of ducts disposed on the two sides of a respective membrane are connected to be fed with a medium independently of one another. In other words, the systems of ducts that straddle a membrane can be fed with the medium, in particular with water or deionized water, independently of one another. In such an arrangement, that contact layer of the membrane which is intended as the anode for the electrolysis process can be supplied with a different medium than that contact layer which is intended as the cathode. The electrolysis apparatus can consequently be used particularly flexibly. For example, in the case of such an arrangement the contact layer of the membrane intended as the cathode can be fed with coolant circulated in the primary loop of a nuclear plant, where as the contact layer of the membrane intended as the anode can be fed deionized water. An electrolysis apparatus designed in such a way can consequently be used as a hydrogen generator for the reactor coolant that is integrated directly into the coolant loop of a nuclear plant. The systems of ducts of the contact plates arranged on both sides of a membrane are in this case expediently connected to gas removal systems kept separate from one another.

In accordance with a further feature of the invention, the membrane electrolysis cells are arranged in a stack, and the stack is disposed in a housing. The housing has an end face with a fixing element for bracing the membrane electrolysis cells to one another. This feature leads to particularly reliable current conduction within the electrolysis apparatus. Neighboring membrane electrolysis cells can in this case be pressed flat against one another by means of the fixing elements, so that a particularly reliable conductive connection is ensured between each contact layer and the contact plate respectively assigned to it.

In accordance with again a further feature of the invention, an analysis unit is electrically connected to at least one of the contact layers, the analysis unit determining a decay time of a voltage signal of the membrane when a power supply to the membrane is disconnected. This feature results in particularly high operational reliability of the electrolysis apparatus. This is based on the perception that an operationally induced failure of a membrane electrolysis cell is attributable comparatively frequently to damage to its membrane, for example perforation. Such damage to a membrane by perforation can be detected in a particularly simple way by measuring the time over which the voltage drops across the membrane after disconnection of the power supply to the membrane. This is because, in this case the membrane electrolysis cell to be investigated should briefly behave like a fuel cell, since there are still remains of the previously generated hydrogen or oxygen on both sides of the membrane. If the membrane is intact, the voltage dropping across the membrane should therefore remain constant for a short time before the voltage signal decays. If, on the other hand, the membrane is damaged, the decay of the voltage signal begins comparatively earlier. A conclusion as to the state of the membrane is consequently possible by determining the decay time of the voltage signal. Consequently, a defective membrane electrolysis cell can be identified in a particularly simple way.

In accordance with a concomitant feature of the invention, there is provided a sensor for determining a purity of a gas. The sensor is connected to the analysis unit. The indication of the decay time of a membrane together with the indication of the gas purity can be used to derive in a particularly simple way a prediction of the future operational reliability of the respective membrane. The electrolysis apparatus can consequently be operated particularly reliably even when malfunctions of an individual membrane electrolysis cell occur. A defective membrane electrolysis cell may in this case be bypassed, so that it no longer contributes to gas production, the serviceability of intact membrane electrolysis cells not being adversely affected.

The advantages achieved with the invention are, in particular, that the systems of ducts provided in the contact plates ensure that the medium to be electrolytically decomposed is supplied to the membranes reliably and over a large area, while at the same time a particularly compact design is obtained. The membrane electrolysis cells can in this case be operated independently of one another, so that the serviceability of the electrolysis apparatus is maintained even if individual membrane electrolysis cells should fail. The analysis unit provided for determining the decay time of a voltage signal at a selected membrane also allows a defective membrane electrolysis cell to be detected in a particularly simple way. If malfunctions occur, the isolation of a defective membrane electrolysis cell is consequently possible in a particularly simple way, it being possible to maintain the operation of the electrolysis apparatus with the remaining intact membrane electrolysis cells.

Other features which are considered as characteristic for the invention are set forth in the appended claims.

Although the invention is illustrated and described herein as embodied in an electrolysis apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
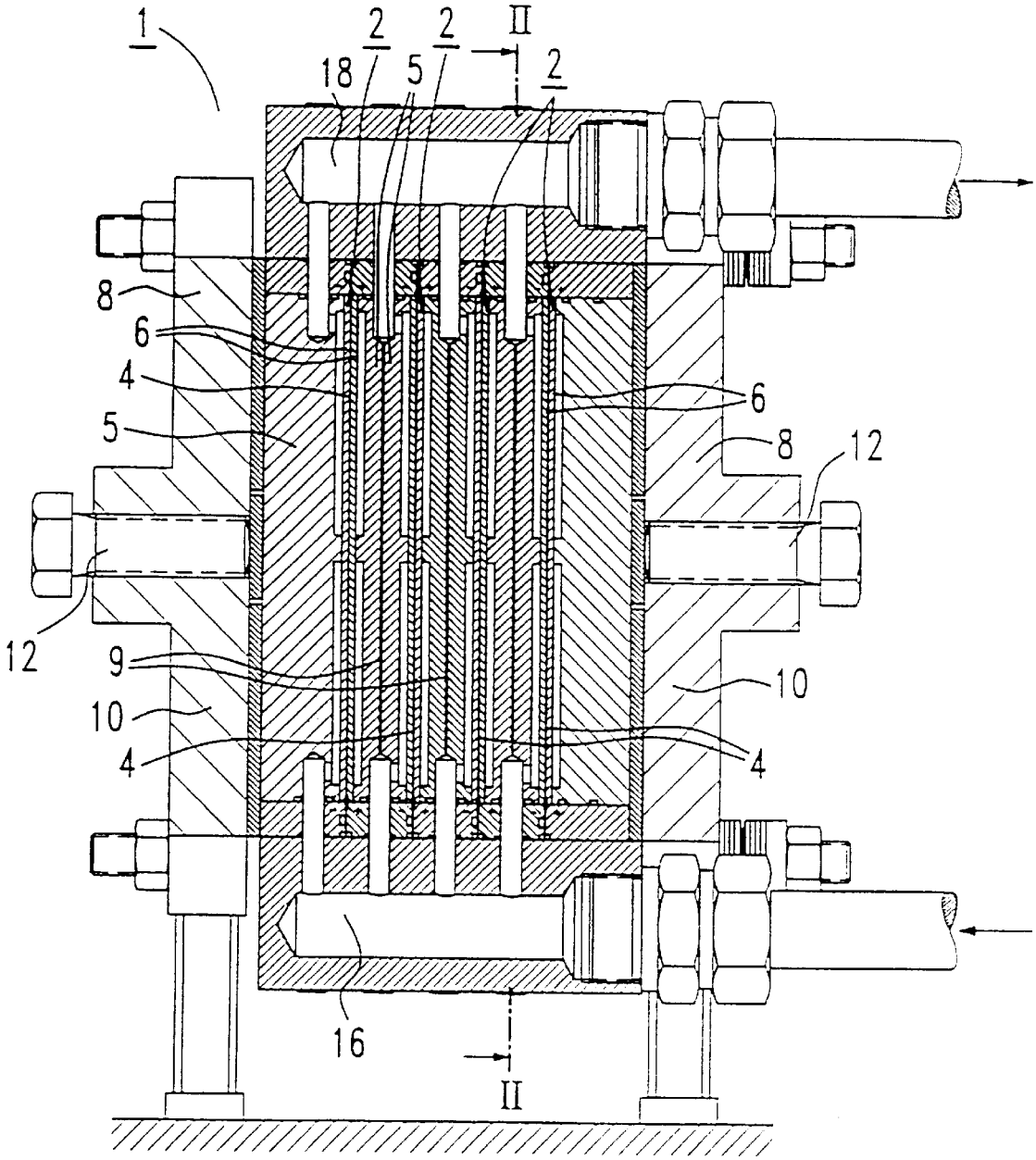
FIG. 1 is a longitudinal section through an electrolysis apparatus.

Referring now to the figures of the drawing in detail, wherein same parts are identified with the same reference numeral throughout, and first, particularly, to FIG. 1 thereof, there is seen an electrolysis apparatus 1 in the form of a membrane electrolyzer. The apparatus comprises a number of membrane electrolysis cells 2 connected electrically in series. In the exemplary embodiment according to FIG. 1, four series-connected membrane electrolysis cells 2 are represented. It will be appreciated, however, that any other number of membrane electrolysis cells 2 may also be provided. Each membrane electrolysis cell 2 has a membrane 4, designed as a cationic exchanger membrane, as the electrolyte for water as the medium to be decomposed. The membrane 4 of each membrane electrolysis cell 2 is provided on each of both sides with a contact layer. The two contact layers of a membrane 4 serve as electrodes during the electrolysis operation. In the exemplary embodiment, the contact layer of each membrane 4 intended as the cathode is formed from platinum. The contact layer of each membrane 4 intended as the anode, on the other hand, is mainly formed of iridium.

Respectively arranged on each contact layer of each membrane 4 is a contact plate 5. Each contact layer is in this case electrically connected to the contact plate 5 respectively assigned to it by means of a porous conductor plate 6. The porous conductor plate 6, which may be produced for example on a titanium basis, is in this case respectively arranged between the contact layer and the contact plate 5 assigned to the latter.

The membrane electrolysis cells 2, respectively formed by a membrane 4, two conductor plates 6 and two contact plates 5, are arranged in the form of a stack within a housing 8. Neighboring contact plates 5 of different membrane electrolysis cells 2 are thereby electrically separated from one another in each case by an isolator plate 9. The connection and attachment of the membrane electrolysis cells 2 one behind the other is brought about by an external system of lines that is not represented in any more detail for purposes of clarity. Alternatively, neighboring contact plates 5 of different membrane electrolysis cells 2 may also be directly in electrical contact with one another or else be integrally formed. The housing 8 respectively has on its end face 10 a screw provided as the fixing element 12, for bracing the membrane electrolysis cells 2 to one another.

Figure 2:
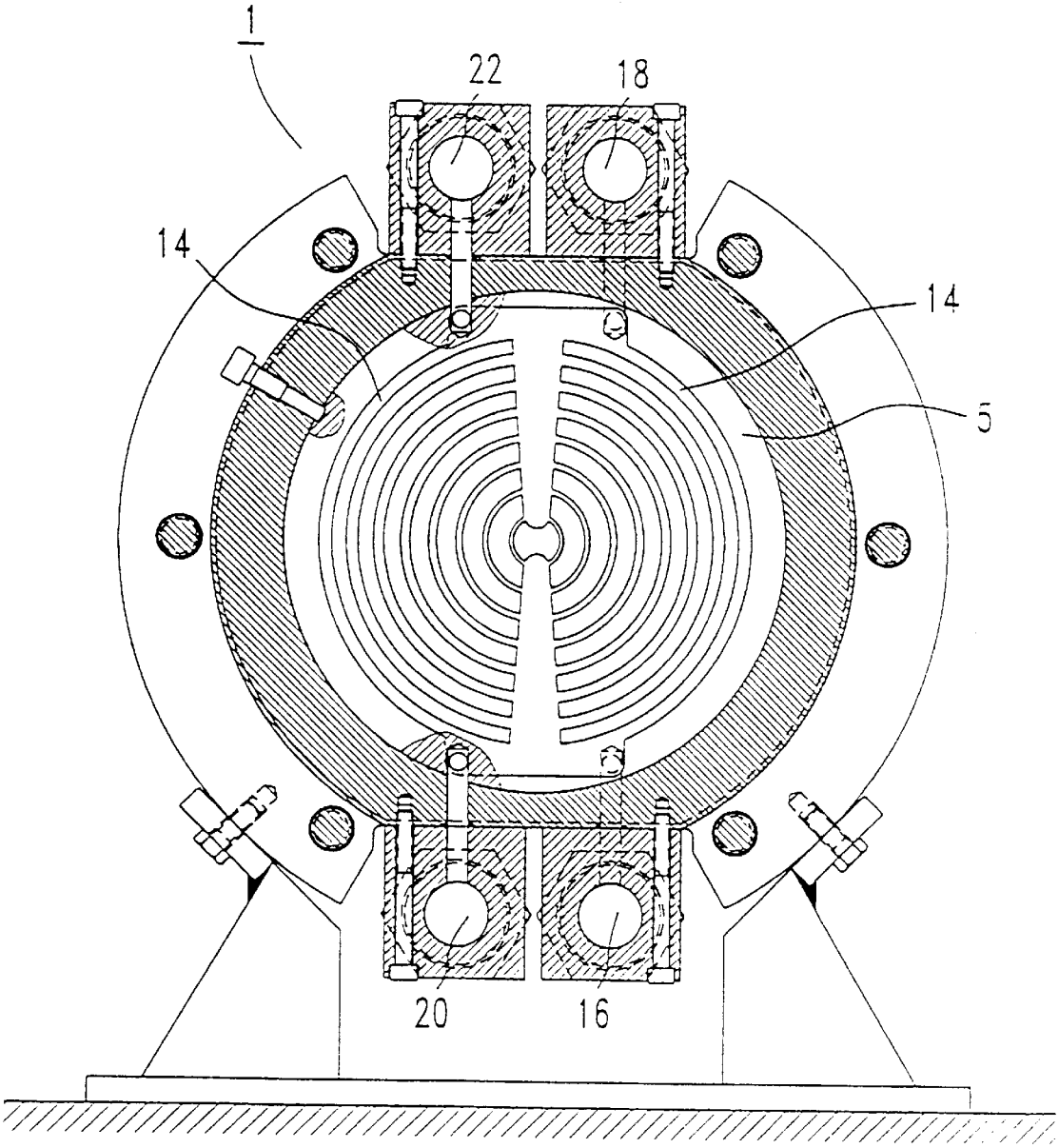
FIG. 2 is a cross section of the electrolysis apparatus.

Referring now to the cross section of the electrolysis apparatus shown in FIG. 2, each contact plate 5 is of an approximately circular design and has on its surface facing the contact layer assigned to it a system of ducts 14. The system of ducts 14 is thereby formed by depressions extending into the respective contact plate 5, which are arranged on the surface of the respective contact plate 5 in the form of concentric segments of a circle. The system of ducts 14 of each contact plate 5 is intended here for transporting to the respective membrane 4 medium to be electrolytically decomposed. For this purpose, the system of ducts 14 of each contact plate 5 is connected to a supply system for an electrolysis medium. Furthermore, a removal system for gas or for electrolysis medium treated with gas is connected to the system of ducts 14 of each contact plate 5.

The electrolysis apparatus 1 is at the same time designed in such a way that the systems of ducts 14 of the contact plates 5 arranged on both sides of a membrane 4 can be fed with a medium independently of one another. Furthermore, the medium or else a gas released during the electrolysis can be removed from the systems of ducts 14 of the contact plates 5 arranged on both sides of a membrane 4 independently of one another. For this purpose, the systems of ducts 14 of all the contact plates 5 which are assigned to a contact layer of a membrane 4 intended as the cathode are connected on the input side to a common supply system 16 and on the output side to a common removal system 18.

The systems of ducts 14 of those contact plates 5 which are assigned to a contact layer of a membrane 4 intended as the anode are, on the other hand, connected on the input side to a supply system 20 that is independent of the supply system 16 and on the output side to a removal system 22 that is independent of the removal system 18. In such an arrangement, the feeding of the contact layers intended as cathodes with an electrolysis medium other than the electrolysis medium used for feeding the contact layers intended as anodes is possible. The electrolysis apparatus 1 can consequently be used particularly flexibly. For example, the electrolysis apparatus 1 may be integrated directly into a coolant loop of a nuclear plant, the contact layers intended as cathodes being fed directly with reactor coolant as the hydrogen from the electrolysis being returned directly into the coolant loop of the nuclear plant. The contact layers intended as the anode can in this case be fed with deionized water. During the operation of an electrolysis apparatus 1 arranged in such a way, the anodes which can be fed with deionized water are subjected to a higher operating pressure than the cathodes subjected to reactor coolant. Consequently, a release of reactor coolant into the surroundings is reliably avoided even in the event of a membrane rupture or a leak.

Figure 3:
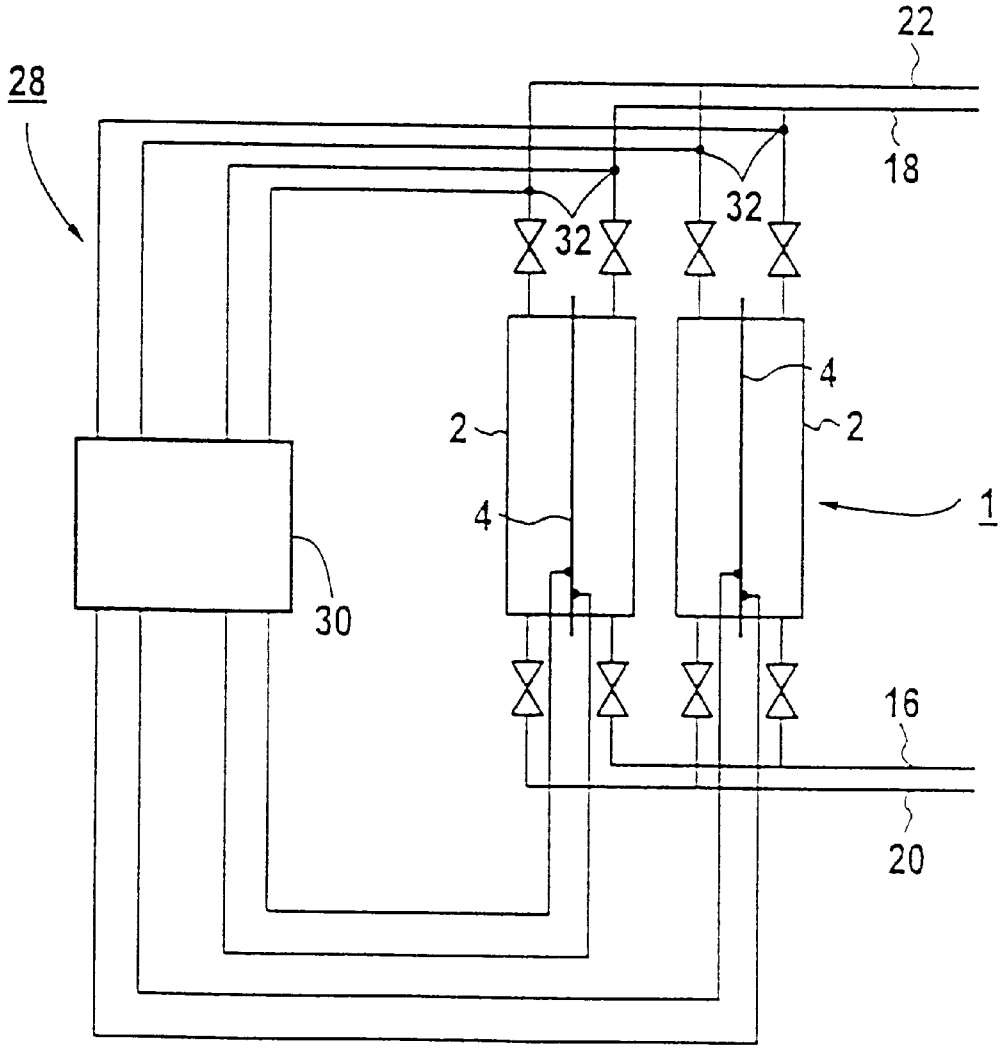
FIG. 3 is a diagrammatic view of a gas injection device for a subsystem of a technical plant.

A gas injection system 28 for a technical plant, in particular for the primary loop of a pressurized water reactor, is diagrammatically represented in FIG. 3. The gas injection system 28 comprises as a hydrogen generator the electrolysis apparatus 1, the supply and removal systems 16, 18, 20, 22 of which are connected to the technical plant in a way not represented in any more detail. The electrolysis apparatus 1 further comprises an analysis unit 30. The contact layers of each membrane 4 are in this case electrically connected to the analysis unit 30.

The analysis unit 30 is designed to determine the decay time of a voltage signal of a membrane 4 after disconnecting the power supply to this membrane 4. Conclusion as to the serviceability of the respective membrane 4 can then be drawn in the analysis unit 30 for the decay time of the voltage signal. This is because, if the membrane 4 is intact, after disconnecting the power supply the respective membrane electrolysis cell 2 should act for a short time as a fuel cell, until the gases previously released from it by electrolysis are transported away. Therefore, if the membrane 4 is intact, the voltage signal dropping across it should be initially constant for a short time before a decay begins. If the membrane 4 is defective, for example owing to perforation, on the other hand, the voltage should decay immediately after switching on the power supply, so that an intact membrane 4 can be distinguished from a defective membrane 4 by the analysis unit 30.

For additional diagnostic purposes, a sensor 32 for determining the purity of a gas is respectively connected into the removal systems 18 and 22 for each membrane 4. The sensors 32 are likewise connected to the analysis unit 30. By a combination of the information on the decay time of the voltage signal at a selected membrane 4 with the information on the purity of the electrolysis gases supplied by the associated membrane electrolysis cell 2, a particularly reliable prediction concerning the operating behavior of the respective membrane electrolysis cell 2 is possible.

Reliable cooling of the electrolysis apparatus 1 during its operation is ensured by the choice of a suitable water throughput through the membrane electrolysis cells 2. Serving here as the cooling medium is the medium to be treated, supplied to the electrolysis apparatus 1. In addition, further cooling devices may be provided for the housing 8, for example in the form of cooling ribs.

I claim:

1. An electrolysis apparatus adapted for electrolytical decomposition of a fluid selected from the group consisting of water and gas, comprising:

a plurality of membrane electrolysis cells each having a membrane formed with a contact layer on both sides thereof;

a contact plate disposed on each of said contact layers and having a surface facing a respective said contact layer; and each said contact plate having a plurality of concentric circular segments of ducts formed in said surface facing said contact layer for transporting the fluid along said ducts.

2. The electrolysis apparatus according to claim 1, wherein said membrane electrolysis cells are electrically connected in series.

3. The electrolysis apparatus according to claim 1, which further comprises a porous conductor plate disposed between each said contact layer and a respective said contact plate.

4. The electrolysis apparatus according to claim 1, wherein each said plurality of ducts disposed on the two sides of a respective said membrane are connected to be fed with the fluid independently of one another.

5. The electrolysis apparatus according to claim 1, wherein said membrane electrolysis cells are arranged in a stack, and including a housing receiving said stack, said housing having an end face with a fixing element for bracing said membrane electrolysis cells to one another.

6. An electrolysis apparatus adapted for electrolytical decomposition of a fluid selected from the group consisting of water and gas, comprising:

a plurality of membrane electrolysis cells each having a membrane formed with a contact layer on both sides thereof;

a contact plate disposed on each of said contact layers and having a surface facing a respective said contact layer;

each said contact plate having a system of ducts formed in said surface facing said contact layer for transporting the fluid along said ducts; and an analysis unit electrically connected to at least one of said contact layers, said analysis unit adapted to analyze a voltage signal of said membrane when a power supply to said membrane is switched off.

7. The electrolysis apparatus according to claim 6, which further comprises a sensor for determining a purity of a gas connected to said analysis unit.

* * * * *